Figure 6:
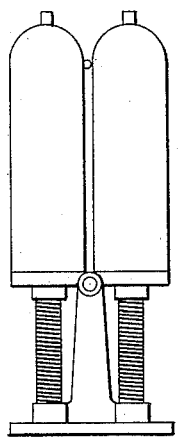

(No Model.) 5 Sheets—Sheet 1.
F. J. SPRAGUE.
CONTACT DEVICE FOR ELECTRIC RAILWAYS.
No. 433,425. Patented July 29, 1890.
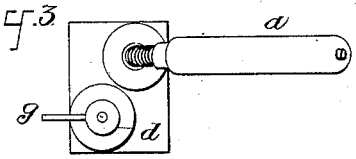
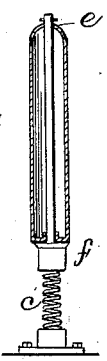
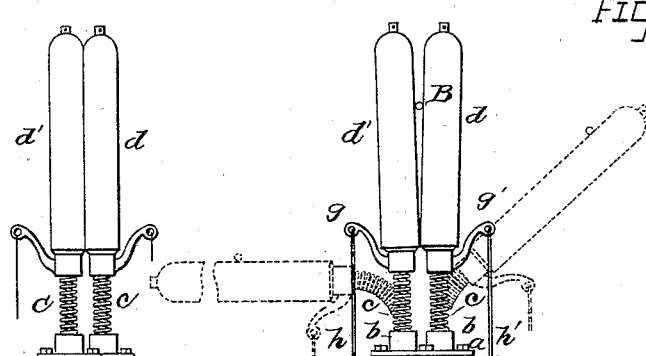
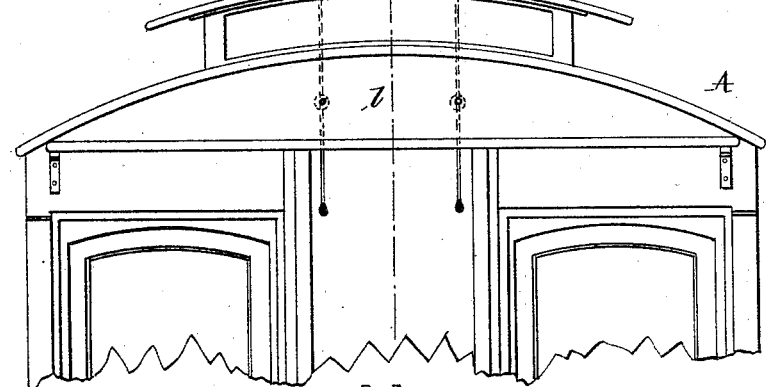
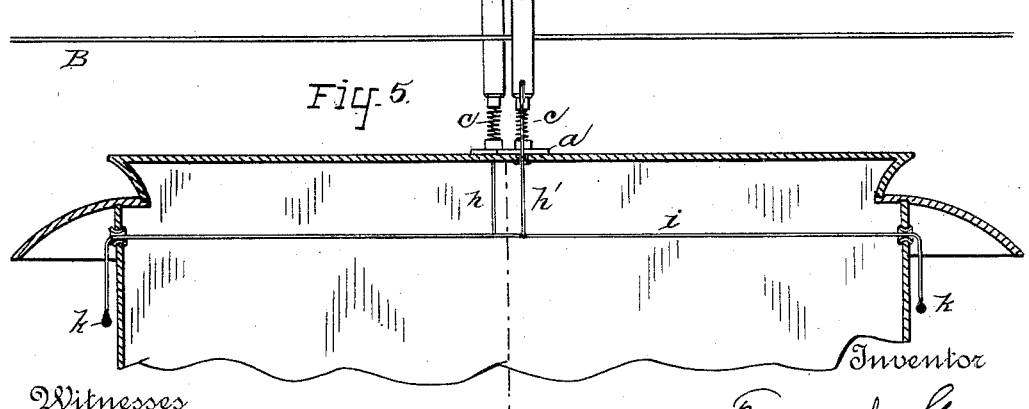

(No Model.) 5 Sheets—Sheet 2.

F. J. SPRAGUE.
CONTACT DEVICE FOR ELECTRIC RAILWAYS.

No. 433,425. Patented July 29, 1890.

Witnesses
M. B. Dodge
William Pelzer

Inventor
Frank J. Sprague
By his Attorneys (No Model.) 5 Sheets—Sheet 3.

F. J. SPRAGUE.
CONTACT DEVICE FOR ELECTRIC RAILWAYS.

No. 433,425. Patented July 29, 1890.

Witnesses  
Inventor  
Frank J. Sprague  
By his Attorneys

THE NORRIS PETERS CO., PHOTO-LITHO., WASHINGTON, D. C.

(No Model.)  5 Sheets—Sheet 4.

F. J. SPRAGUE.
CONTACT DEVICE FOR ELECTRIC RAILWAYS.

No. 433,425.  Patented July 29, 1890.

Witnesses  
M. B. Dodge.  
William _____

Inventor  
Frank J. Sprague  
By his Attorneys (No Model.) 5 Sheets—Sheet 5.
F. J. SPRAGUE.
CONTACT DEVICE FOR ELECTRIC RAILWAYS.
No. 433,425. Patented July 29, 1890.
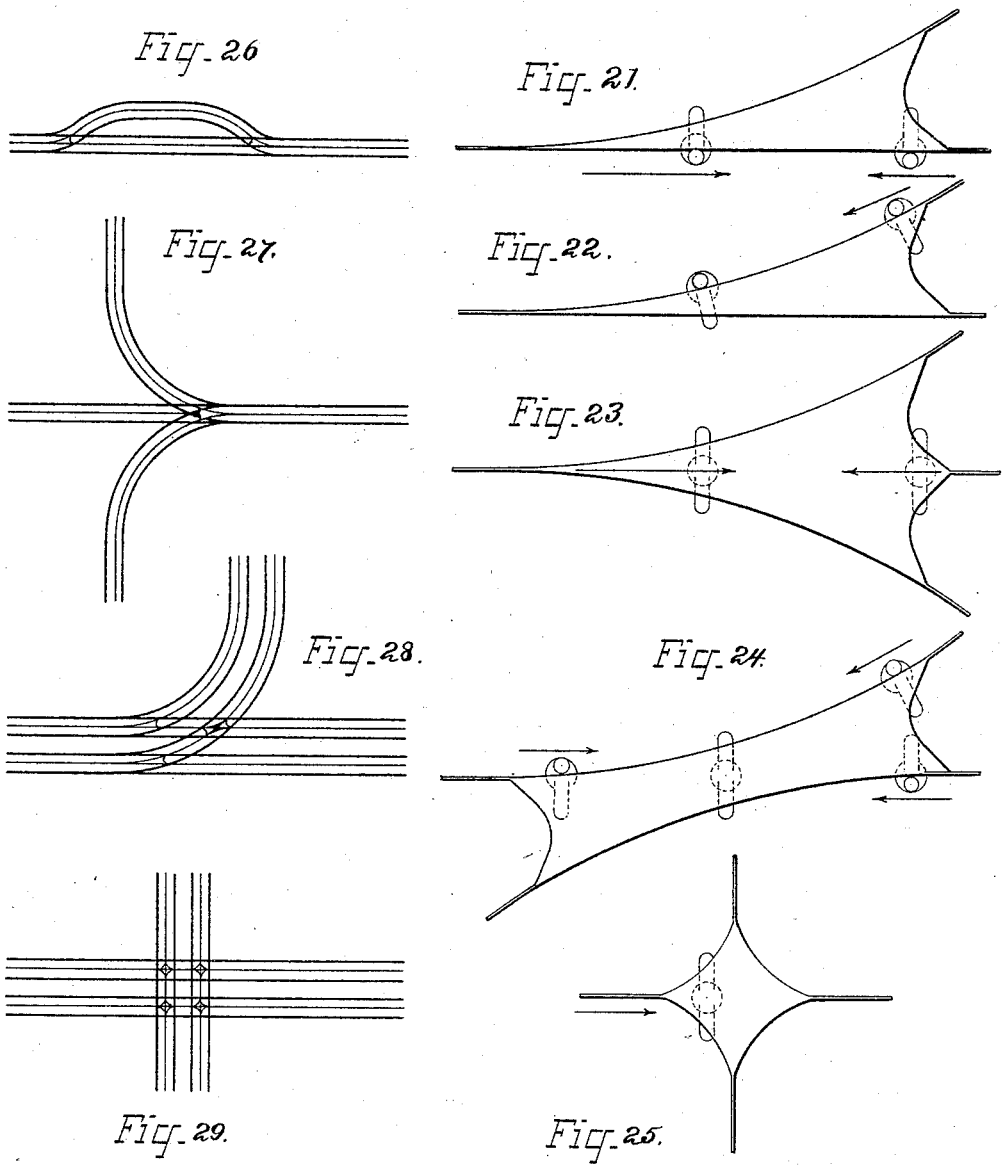
WITNESSES:
INVENTOR
Frank J. Sprague
BY
ATTORNEYS

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY, OF SAME PLACE.

CONTACT DEVICE FOR ELECTRIC RAILWAYS.

SPECIFICATION forming part of Letters Patent No. 433,425, dated July 29, 1890.

Application filed July 2, 1889. Serial No. 316,322. (No model.)

*To all whom it may concern:*

Be it known that I, FRANK J. SPRAGUE, a citizen of the United States, residing at New York city, in the county of New York and State of New York, have invented a certain new and useful Improvement in Contact Devices for Electric Railways, of which the following is a specification.

The object of my invention is to provide a simple and effective form of traveling contact device for that class of electric railways in which a conductor placed overhead is used, from which current is derived for a motor mounted upon and propelling a car. More especially my object is to provide a contact device of such character as to readily adapt itself or be adapted to changes in the relative height of the car and the overhead conductor and in the direction of the conductor relative to the track, and so that the contact device can readily pass by switches or branch lines or other obstructions which occur in the overhead conductor. A further object is to enable the position of the contact device to be readily controlled or adjusted by the person in charge of the car.

In carrying my invention into effect I employ as a traveling contact device two arms, which arms are preferably in the form of rollers, and which are placed above the car in proximity to each other and in a substantially vertical position when not inclined therefrom by contact with the overhead conductor or by any other external stress or pressure. These arms or rollers are free at their upper ends, and at their lower ends are supported by springs or other flexible supports in a suitable manner, so that they are free to move on their supports. The two arms or rollers are so situated that when the car is in operation they extend up one on each side of the overhead conductor and both in contact therewith, so that such conductor is clasped between them, and by the pressure of such conductor they are both inclined away from each other to some extent and meet the conductor at an angle thereto, so as to make an underneath or upward pressure contact with the conductor. I prefer to attach a cord or similar device to each roller or arm, which extends to within reach of the operator or person having charge of the car, whereby such person is enabled to alter or adjust the position of either or both of the arms or rollers relative to the conductor by drawing the same down on its flexible support to remove one or both of the rollers from contact with the conductors, and to control the movements of the rollers to replace them on the conductor if they are accidentally displaced.

When a branch conductor extends from the overhead conductor to one side, the contact arm or roller on the other side may be drawn down away from the conductor by the operator and the contact maintained by a single roller until the same shall have passed the intersection of the branch conductor, when the other arm or roller may be released and allowed to make contact again. In passing switch-plates interpolated in the conductor either or both of the rollers may be drawn down by hand, so that they pass under the switch-plate, making an underneath contact therewith, or, being flexibly mounted, they may themselves be depressed by the pressure of the switch-plate, so as to pass beneath the same.

My invention is illustrated in the accompanying drawings.

Figure 7:
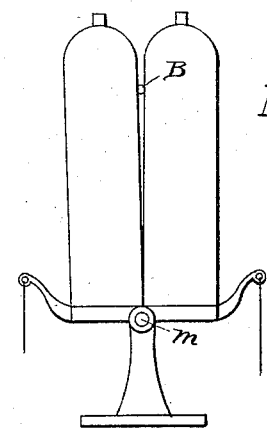
Figure 9:
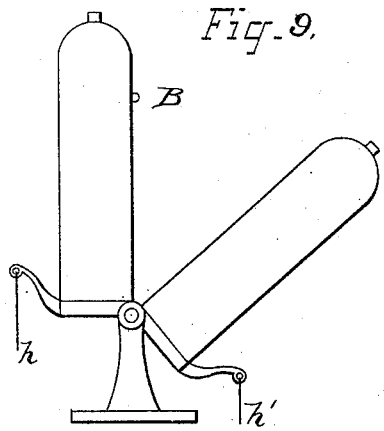
Figure 8:
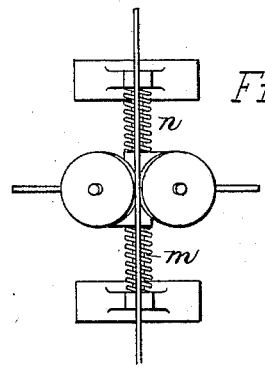
Figure 11:
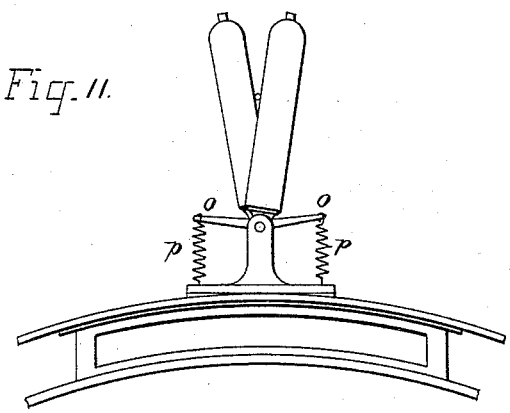
Figure 15:
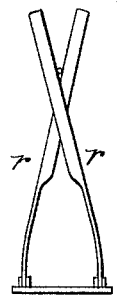
Figure 12:
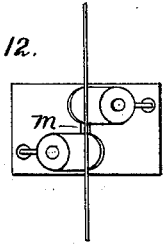
Figure 16:
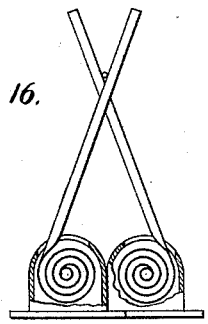
Figure 13:
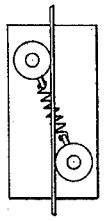

Figure 1 is an end view of the upper portion of a street-car provided with a contact device embodying my invention, with the same in engagement with the conductor. Fig. 2 illustrates the position of the contact device when not in contact with the conductor. Fig. 3 is a top view showing one of the contact devices depressed; Fig. 4, a vertical section of one of the rollers of Fig. 1; Fig. 5, a longitudinal section of the upper part of the car with the contact devices in engagement with the conductor; Fig. 6, a front view of a modified form of contact device; Fig. 7, a front view of still another form, of which Fig. 8 is a top view; Fig. 9, a front view showing one of the rollers depressed, and Fig. 10 a front view showing both rollers depressed. Fig. 11 is a front view of another modification, of which Fig. 12 is a top view. Fig. 13 is a top view, and Fig. 14 a side view, of still another form. Figs. 15 and 16 illustrate the use of different forms of spring-arms other than rollers. Figs. 17 to 25 show the operation of my invention in connection with switch-plates of various kinds, and Figs. 26 to 29 illustrate the arrangement of such switch-plates in overhead conductors.

Referring first to Figs. 1 to 5, A represents an electric-railway car, which it will be understood is provided with an electric motor mounted upon and propelling it. B is the overhead conductor for conveying current to the motor and to other motors which run on the same line, the system shown being one in which the earth or the rails of the track are used for the return-circuit. Upon the top of the car is a metal plate $a$, upon which are set two supporting-blocks $b\ b$, from which extend upwardly two spiral springs $c\ c$. Each spring $c$ carries a roller $d$ or $d'$, such rollers being preferably hollow and being made of metal and mounted so as to be capable of revolution on a spindle $e$, fixed to a disk $f$, carried at the top of spring $c$. From each of the spring-arms thus formed there extends a finger $g$ or $g'$, and to these fingers are secured, respectively, the cords $h$ and $h'$, which cords extend to the ends of the car, preferably entering the car at its middle part, and being secured to a common cord $i$, which extends out in both directions to the platforms and terminates in suitable handles $k$. By this means the position of both arms may be controlled from either end of the car. Suitable electrical connections are made from the contact-arms $d\ d'$ to the motor on the car, such connections being indicated by the broken line $l$, extending from the plate $a$ down through the car. The normal position of the contact-arms when the car is running is illustrated in Figs. 1 and 5. As will be seen, they extend in a position inclined from the vertical, being maintained by the springs $c$ in such position against the conductor B. When not in contact with the conductor, the spring-arms stand vertically, as shown in Fig. 2, they being placed out of line transversely, so that they do not come into contact with each other when so situated.

It will be seen that the length of the arms or rollers is such that the car is capable of considerable vertical movement on its springs, or the height of the conductor relative to the car may vary to a considerable extent without impairing the contact of such arms or rollers with the conductor, and also that any lateral deflections of the conductor from the line of a track will be followed by one or both of the arms or rollers, so that contact will be continually maintained. When it is desired to adjust one or both of the arms or rollers away from the conductor or to lower such arms or rollers, in order to pass through a tunnel or under a bridge or by some other obstruction, either or both may be brought down by means of the cord, as indicated by the dotted lines in Fig. 1, to a position close to the car-roof, or to any position between this and the vertical which may be required. Fig. 3 shows the arm $d'$ extending vertically, while the arm $d$ is in an inclined position.

It will be seen, also, that the spring arms or rollers will yield also in the direction of the length of the car.

Figure 17:
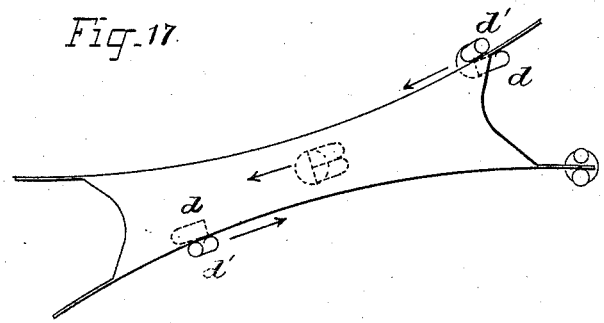
Figure 18:
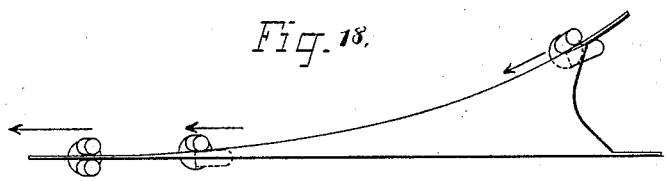
Figure 19:
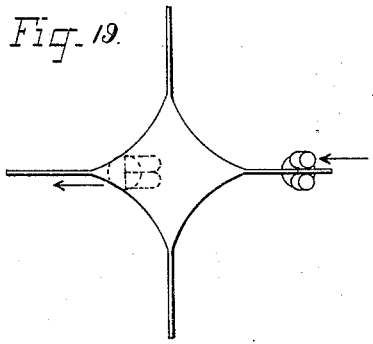
Figure 20:
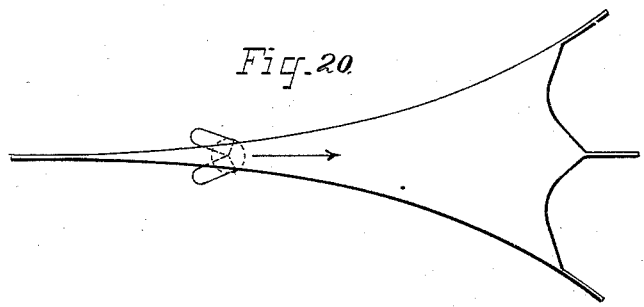

Referring now to Figs. 17 to 29, these illustrate the operation of a contact device in passing switch-plates of various forms. In Fig. 17, which shows a double switch-plate, under which the car passes in both directions, it will be seen that when the contact device comes from the right the arm $d$ is bent down longitudinally and passes under the switch-plate, while the arm $d'$ may remain in its upright position and travel along the edge of the plate. When coming in the other direction, the arm $d$ is depressed, while the arm $d'$ remains upright, and on leaving the plate both arms resume their upright position, or in passing under the plate both arms may be depressed, as indicated at the middle of Fig. 17. Fig. 18 shows a similar turn-out switch-plate, in passing which one arm is depressed, while the other travels along the edge. In a switch-plate where two conductors cross at right angles, as in Fig. 19, both arms are depressed in passing under the plate. Fig. 20 shows the arms partially depressed as they travel on the narrow part of the switch-plate. Figs. 21 to 29 show the spring arms or rollers drawn down by hand by means of the cord H H', in order to pass under switch-plates of different forms, whose position relative to the line is indicated in Figs. 26 to 29, each of these figures corresponding with one of Figs. 21 to 25. It is not thought necessary to describe in detail the operation in each of these cases, since the same will be evident from an examination of the drawings and from what has been already stated.

Figure 10:
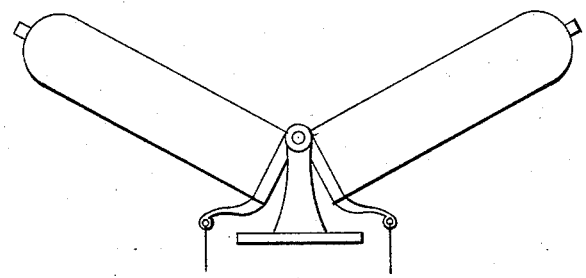

In the form of my invention shown in Figs. 6 to 10 the two contact arms or rollers are hinged on a spindle $m$, extending longitudinally of the car and provided with a spring $n$, which tends to raise the said arms or rollers to a vertical position against the conductor B, which is between them, and from which vertical position they may be adjusted by means of the cords H H', as before, into various positions, such as are illustrated in Figs. 9 and 10.

Figure 14:
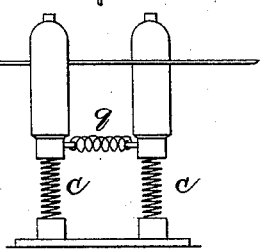

In the form shown in Figs. 11 and 12 the two arms or rollers are hinged together on a spindle $m$, and from said spindle fingers $o$ extend laterally, to the ends of which are attached springs $p$, attached to the car-roof, whereby the arms or rollers are thrown upwardly toward their vertical position. Figs. 13 and 14 show the rollers mounted, as before, on flexible springs $c$, and also joined by a spring $q$, which tends to draw them together.

In Fig. 15 the contact-arms are blades of spring metal $r\ r$, which cross each other and clasp the conductor beneath them, and in Fig. 16 such arms are supported by spirally-coiled springs, forcing them together upon the conductor. Any of these forms may, it is evident, be provided with cords or other devices extending within reach of the operator for adjusting their position.

What I claim is—

1. In an electric railway, the combination, with a car and a stationary conductor, of a contact device consisting of two flexibly-supported and independently-movable arms secured to the car at one end and free at their other ends and making contact on their sides with opposite sides of the conductor, substantially as set forth.

2. In an electric railway, the combination, with a car and a stationary conductor, of a contact device consisting of two flexibly-supported and independently-movable rollers secured to the car at one end and free at their other ends and making contact on their sides with opposite sides of the conductor, substantially as set forth.

3. In an electric railway, the combination of a car, a supplying-conductor, a contact device supported by the car independently of the supplying-conductor and so as to have a universal movement and maintaining a traveling contact with said supplying-conductor, and a flexible connecting device, such as a cord, extending from said contact device to within reach of the operator for moving said contact device, substantially as set forth.

4. In an electric railway, the combination of a car, a supplying-conductor, a contact device supported by the car independently of the supplying-conductor and so as to have a universal movement and maintaining a traveling contact with said supplying-conductor, and a flexible connecting device, such as a cord, extending from said contact device to the platform of the car for moving said contact device, substantially as set forth.

5. In an electric railway, the combination, with a car and a supplying-conductor, of two flexibly-supported arms extending above the car on opposite sides of the conductor and means, such as a cord, extending from each of said arms to within reach of the operator for adjusting said arms, substantially as set forth.

This specification signed and witnessed this 18th day of June, 1889.

FRANK J. SPRAGUE.

Witnesses:
WILLIAM PELZER,
D. H. DRISCOLL.